United States Patent
Chapman et al.

(10) Patent No.: US 8,085,836 B2
(45) Date of Patent: *Dec. 27, 2011

(54) ROBUSTNESS IMPROVEMENT FOR BANDWIDTH LIMITED COMMUNICATION SYSTEM

(75) Inventors: William L. Chapman, Hemlock, NY (US); Shawn E. O'Hara, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 953 days.

This patent is subject to a terminal disclaimer.

(21) Appl. No.: 11/422,340

(22) Filed: Jun. 6, 2006

(65) Prior Publication Data

US 2006/0209713 A1   Sep. 21, 2006

Related U.S. Application Data

(63) Continuation of application No. 10/174,853, filed on Jun. 19, 2002, now Pat. No. 7,082,479.

(51) Int. Cl.
   *H04B 3/46* (2006.01)
(52) U.S. Cl. .................................. 375/226; 375/286
(58) Field of Classification Search .............. 375/226, 375/286; 709/248, 236, 224; 370/419, 252, 370/509, 473; 714/807
   See application file for complete search history.

(56) References Cited

U.S. PATENT DOCUMENTS

| | | | |
|---|---|---|---|
| 4,400,709 A | 8/1983 | de Kermadec et al. ........ 346/154 |
| 4,486,739 A | 12/1984 | Franaszek et al. | |
| 4,514,820 A | 4/1985 | Mirow et al. ................. 364/858 |
| 4,594,712 A * | 6/1986 | Perry et al. .................... 714/801 |
| 5,107,489 A | 4/1992 | Brown et al. | |
| 5,136,410 A | 8/1992 | Heiling et al. ................ 359/110 |
| 5,162,790 A | 11/1992 | Jasinski ................... 340/825.44 |
| 5,185,862 A | 2/1993 | Casper et al. ................. 395/250 |
| 5,581,368 A | 12/1996 | Dirr ............................. 358/426 |
| 5,617,333 A | 4/1997 | Oyamada et al. ......... 364/514 R |
| 5,852,630 A * | 12/1998 | Langberg et al. ............. 375/219 |
| 5,896,442 A * | 4/1999 | Song et al. ................. 379/88.07 |

(Continued)

FOREIGN PATENT DOCUMENTS

WO    WO 99/01981    1/1999

OTHER PUBLICATIONS

Patton Electronics Co., internet address: http://www.patton.com/support/pdf/t1-e1-pri_tech_over_lo-res.pdf published May 11, 2001, pp. 1-44.

(Continued)

*Primary Examiner* — Shuwang Liu
*Assistant Examiner* — Helene Tayong
(74) *Attorney, Agent, or Firm* — Justin D. Petruzzelli; Christopher J. White

(57) ABSTRACT

A method and apparatus for the transmission of multiple control characters of the same type to a receiver to improve the retention of transmitter to receiver synchronization in a noisy environment having receiver code that is less complex and does not require an increase in the bandwidth of the system since the control codes are already utilized to initiate other functions. Detection of any of the control characters of the same type by the receiver allows the receiver to maintain proper synchronization. The receiver will detect these control signals and anticipate the occurrence of an event within a predetermined time period.

10 Claims, 8 Drawing Sheets

U.S. PATENT DOCUMENTS

| | | | | |
|---|---|---|---|---|
| 5,905,756 A | * | 5/1999 | Lamkin et al. | 375/222 |
| 6,061,078 A | | 5/2000 | Ng et al. | |
| 6,256,687 B1 | * | 7/2001 | Ellis et al. | 710/71 |
| 6,321,361 B1 | | 11/2001 | Autechaud et al. | 714/807 |
| 6,373,859 B1 | * | 4/2002 | Jedwab et al. | 370/479 |
| 6,477,277 B1 | * | 11/2002 | Chippendale et al. | 382/232 |
| 6,665,306 B1 | | 12/2003 | Thakur et al. | 370/419 |
| 6,801,959 B1 | * | 10/2004 | Crutchfield et al. | 710/30 |
| 7,016,070 B2 | | 3/2006 | Pham et al. | 358/1.3 |
| 7,093,151 B1 | * | 8/2006 | Williams | 713/500 |
| 2003/0086506 A1 | | 5/2003 | Crochon et al. | 375/286 |

OTHER PUBLICATIONS

*Optical Network Design and Implementation*, Vivek Alwayn, Published by Cisco Press, Copyright 2004, ISBN 1587057052, Library of Congress Cataloging-in-Publication No. 2002104849, pp. 27-36.

\* cited by examiner

ROBUSTNESS IMPROVEMENT FOR BANDWIDTH LIMITED COMMUNICATION SYSTEM

CROSS-REFERENCE TO RELATED APPLICATION

This application is a continuation of prior U.S. patent application Ser. No. 10/174,853, filed Jun. 19, 2002, now U.S. Pat. No. 7,082,479 the entire disclosure of which is hereby incorporated herein by reference.

FIELD OF THE INVENTION

The present invention is related to the field of digital communications and more particularly to the field of maintaining synchronization in the transfer of image data.

BACKGROUND OF THE INVENTION

Numerous prior art disclosures relate to communications such as the transmission and receiving of data, as well as handshaking that occurs to accomplish the transmission of data from one point to another point where it is received. Many prior art schemes provide data and control signals redundantly to insure correct reception of the data. Among these redundant schemes is a technique referred to as Forward Error Correction (FEC), which is a method used in communication systems that transmits the information multiple times using different encoding methods. FEC is known to improve signal to noise ratio. By using FEC the system has a better chance of transferring the data from the transmitter to the receiver, error free.

In a data communication system as described in U.S. patent application Ser. No. 09/794,693 entitled MULTIPLE-LEVEL PRINTHEAD USING EMBEDDED HIGH SPEED SERIAL DATA AND CONTROL LINK WITH ON-BOARD EXPOSURE CLOCK GENERATION, assigned commonly with the present invention, the bandwidth is almost completely utilized in the transmission of the image data. In such a system, there is not enough bandwidth for Forward Error Correction (FEC) or for the re-transmission of the full line of image data should a data bit or bits become corrupted during transmission. The bandwidth of this prior art system is so limited that, essentially, error-free transmission of digital data must occur in order for the system to operate properly. These control words provide, in part, a means for the receiver to stay synchronized with the transmitter and add only a small increase in the overall bandwidth required. For such a system a corrupted bit used for image reconstruction could be acceptable since this is a very small percentage of the total image data. On the other hand, a corrupted control word could result in the loss of synchronization between the transmitter and receiver. When synchronization is lost, bit alignment at the receiver is lost and the resulting image is corrupted for the duration of the loss of synchronization. In a relatively noise-free environment, this is possibly acceptable since a corrupted transmission of a control character would occur only rarely. In a high noise environment this may prove unacceptable. When this type of system is deployed in a high noise environment, a method is needed such that synchronization between the transmitter and receiver can be more reliably maintained.

In a printing system such as the one described in U.S. patent application Ser. No. 09/794,693, control characters are sent across a communication channel to designate the starting point of a line of image data, the ending point of the line of data, and the time to start an exposure sequence. In the system described in U.S. patent application Ser. No. 09/794,693, the same control character is used to designate the end of the line of data as to designate the start of the line of data. A separate control character is used to designate the start of the exposure sequence. These control characters are sent with each line of image data. The line of image data that is exposed onto the photo-conductor is the line of data that was sent previously. Basically, the imaging element has a one line buffer that holds the 'just sent' line of data and then exposes the line of data that was sent on the prior transmission interval.

Electrophotographic printing systems typically employ photoconductive drums that turn at a nominal rate. Electronics on the drum generate signals that are sent from the main machine interface to indicate the time period during which the current line of data should be imaged onto the photoconductive drum. The transmitter accesses these signals and determines the appropriate time to send the next line of data to the receiver. In each case the transmitter sends a start of line character (SOL), the image data, an end of line (EOL) control word, and finally the exposure line (EXP) control word. For the system described in U.S. patent application Ser. No. 09/794,693, the SOL character and the EOL control word have the same bit pattern.

In printing systems as described in U.S. patent application Ser. No. 09/794,693, there are many noise sources. The equipment, in general, requires high voltage power supplies and charging elements. There are many opportunities for arcing to occur, which generates a broadband of spurious noise. In this environment the opportunity exists for these external noise sources to interfere or corrupt the communication channel. Since the transmission of data across the link is tied to the movement of the photoconductive drum, the data must be present at the imaging element when the exposure sequence starts. If erroneous data is stored at the imaging element when the exposure sequence starts, a corrupted image will be produced. Specifically, the integrity and timing of the control characters must be maintained since the loss of a single control character interrupts the synchronization between the transmitter and receiver. The resulting image produced at the photo-conductor will be corrupted until the transmitter and receiver can regain synchronization.

From the foregoing discussion, it is apparent that there remains a need within the art for a method and apparatus that can insure correct data transmission in systems having limited bandwidth.

SUMMARY OF THE INVENTION

The present invention provides a method and apparatus of improving the retention of transmitter to receiver synchronization in a noisy environment by the transmission of multiple control characters to a receiver. The system of the invention requires only a modest increase in the bandwidth of the system since the additional control codes are only a small number of bits relative to the total number of control and data bits being transferred. Detection of any of the control characters of the same type by the receiver allows the receiver to maintain proper synchronization. Preferably the transmitter sends specific control characters of the same type that are spaced from each other at known intervals. The receiver will detect these control signals and anticipate the occurrence of an event within a predetermined time period. The present invention provides a method and apparatus for improving the retention of synchronization between the transmitter and receiver. In particular, it provides an improvement on a line-by-line basis by utilizing alternate control characters to provide an indication to the receiver to start receiving the line of image data or to terminate the line. If either control character is received, the receiver recognizes that the end of the line has occurred and will prepare for receiving the next line of data.

The arrival of data can be accurately predicted by the correct detection of the control signal referred to as the Start of Line (SOL) control word. The SOL signal indicates that a line of image data is about to start being transmitted. The invention envisions the provision of multiple versions of the SOL control word to correct problems that exist in environments having high noise levels. The SOL control words are, preferably, distanced from each other by a known time period. The SOL control words also indicate that image data will be arriving at the receiver within a known time, or within a known number of clock cycles. The receiver, on detection of any of these control characters, knows the time, or how many clock cycles remain, between any particular control character and the start of the line of data. The invention employs multiple control characters, any of which can be used to synchronize an event. Therefore, all the control characters would have to be corrupted to interrupt the synchronization between the transmitter and receiver. The additional bandwidth required for the transmission of these additional control characters is minimal and provides a much more robust approach to maintaining synchronization of the communication channel.

If the control character designating the start of the line of data is corrupted, the receiving system will not recognize the line of image data has started and will not store the image data in the storage elements. Similarly, if the control character designating the end of the line of data is corrupted, the receiving system will not recognize the line of data has ended and will continue as if data were being received. The corruption of a single bit in the control character will cause the receiver to misinterpret the SOL or the EOL control words. Since the receiving logic does not realize the transmitter is no longer sending data, erroneous data will be stored in the storage elements. By adding redundant start of line control words and redundant end of line control words, the probability increases that one of the control words will make it to the receiving system uncorrupted. Since the control words all have different bit patterns, the receiver can tell by which bit pattern it receives how many clocks remain before the image data is present and how many clocks have passed since the end of line occurred. Additionally, the control character designating the start of the exposure sequence may still be received. By using this (EXP) control word as an alternate EOL control word, the receiver will terminate the line of data and will wait for the next SOL from the transmitter. Synchronization between the transmitter and receiver will be maintained.

By utilizing multiple control characters that initiate the same function at the receiver, this present invention provides a means for maintaining synchronization in an environment having high noise levels. The loss of data is significantly less and there is less image corruption as well that occurs in the imaging system.

DETAILED DESCRIPTION OF THE INVENTION

Figure 1:
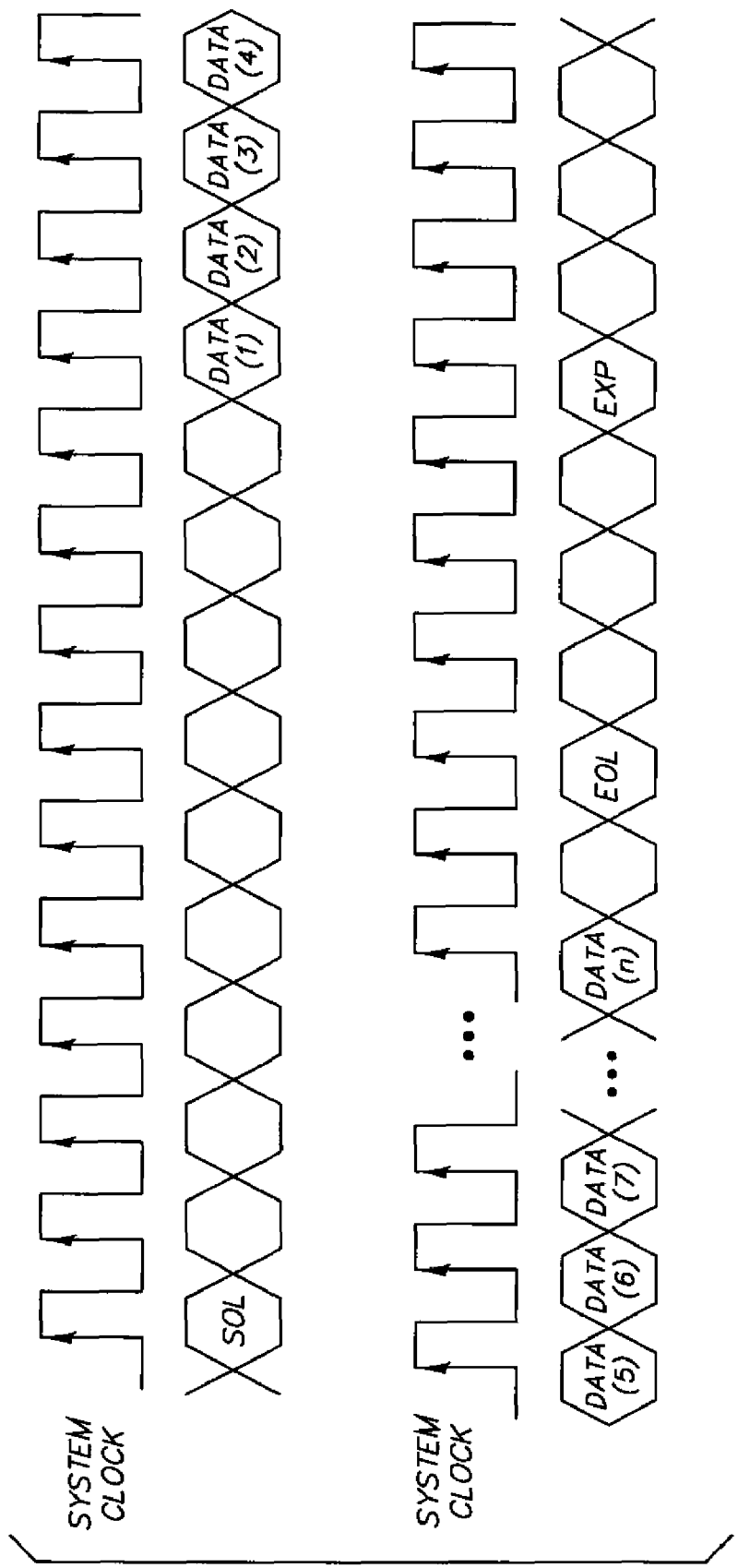
FIG. 1 is a timing diagram illustrating a single control word proceeding data.

Referring to FIG. 1, a timing diagram illustrating the communication sequence having a single start of line (SOL) control word used to proceed data, specifically for the type of printing system as described in U.S. patent application Ser. No. 09/794,693 and illustrated in FIG. 6, and a single end of line (EOL) control word used to indicate the completion of a line of data, provides an example of the type of communication system for which the improvement of the invention applies. The communication channel shown in FIG. 1 will transfer image data to an imaging device by the transmitter sending a control word to identify the start of line (SOL) for the image data. There will be a space of a predetermined number of clock cycles between the start of line (SOL) control word and the first data byte of the image data. The receiver anticipates this space by detecting the start of line (SOL) control word and counting for the predetermined number of clock cycles before characterizing the information on the bus as data. The receiver then transfers the received image data to the appropriate storage location. If the start of line (SOL) control word is corrupted for any reason, such as noise in the channel, the receiver will not have an opportunity to properly detect and decode the control word. Failure of the receiver to decode the start of line (SOL) control word generally results in the data not being transferred properly because the receiver has no way of knowing that a line of image data is available. Thus, the receiver is not prepared to receive the data and transfer the data to the proper area or storage location. The invention improves over the type of communication channel illustrated in FIG. 1 by employing a communication system that transmits redundant control words and a receiver with the capability of detecting and decoding multiple control words to indicate the same event.

Figure 2:
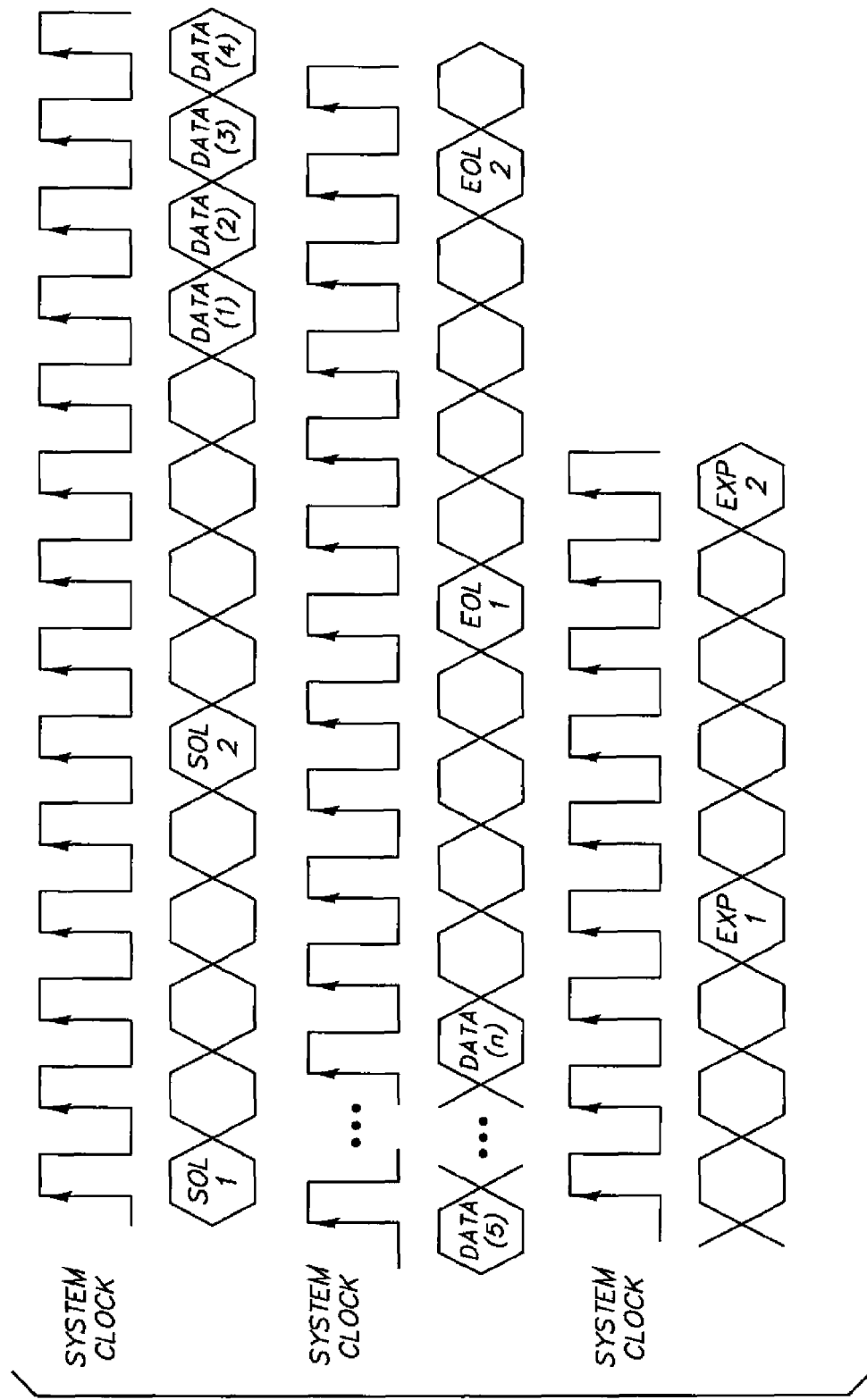
FIG. 2 is a timing diagram illustrating dual control words proceeding data.

The invention addresses the problem of data loss resulting from failure to detect control words by sending additional control words. Referring to FIG. 2, which is a timing diagram illustrating the use of dual control words proceeding data, a second start of line (SOL2) control word is shown being sent in addition to the first start of line (SOL1) control word prior the arrival of data. The probability of the receiver detecting at least one of the start of line SOL1 or SOL2 control words is increased substantially over the probability of using a single start of line control word as illustrated in FIG. 1. The preferred embodiment does not actually use redundant control words but envisions using start of line SOL1, SOL2 control words having different bit patterns. Other embodiments sending identical bit patterns are also envisioned, as are embodiments using separate handshaking lines. The preferred embodiment employs start of line control words having different bit patterns because the synchronous nature of the preferred embodiment is enhanced by the individual decoding at the receiver of each of the control words. The preferred embodiment has data and control words transmitted across the same bus and timing considerations are crucial in such a synchronous design. Separately decoding each of the control words allows timing configurations with respect to data that is transferred across the same bus to be established. The timing between the reception of the start of line SOL1, SOL2 control words to the beginning of a line of image data is a predetermined number that is known to the receiver. The technique of sending multiple control words could be extended by sending a different number, call it 'N', of control words, wherein the probability of at least one control words being correctly identified by the receiver improves as 'N' increases.

Figure 3:
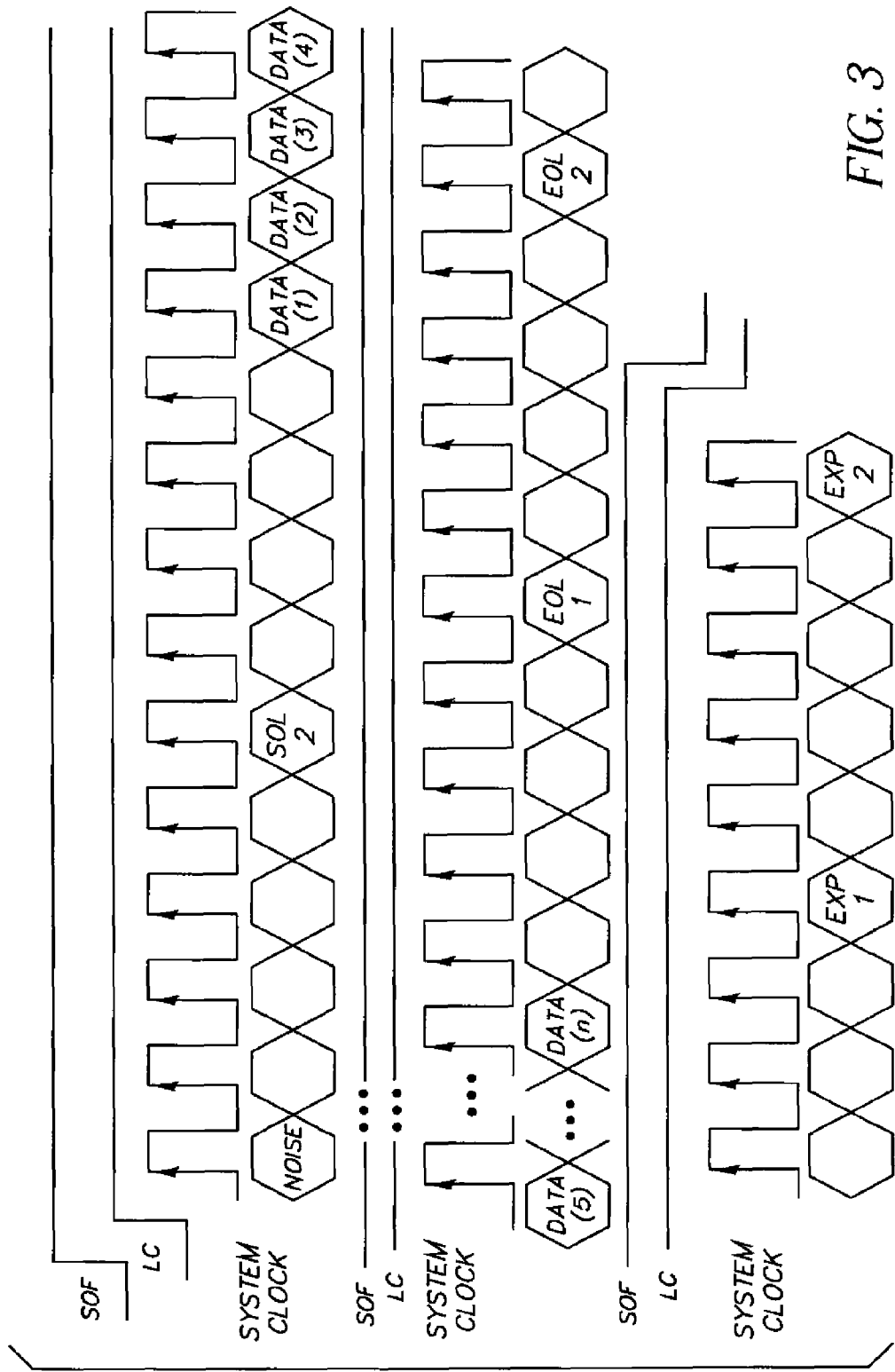
FIG. 3 is a timing diagram illustrating the communication between transmitter and receiver.
Figure 6:
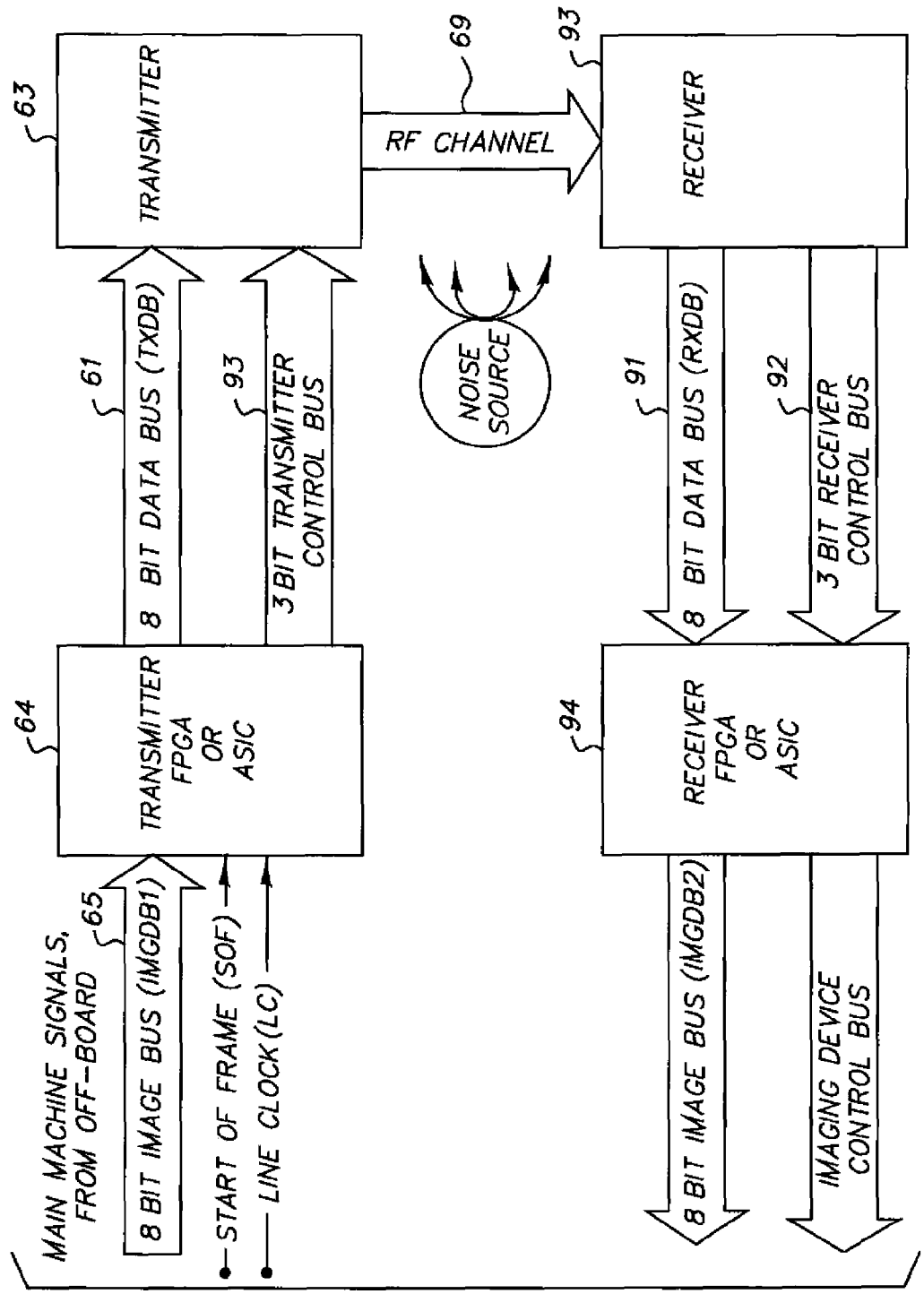
FIG. 6 is a block diagram illustrating the transmitter and receiver architecture of the invention.

The system shown in FIG. 3 is very much like FIG. 2 but illustrates an implementation of the preferred embodiment to solve the aforementioned problems. As shown in FIG. 3, the transmitter receives a start of frame (SOF) control word as an indication from the drum electronics. The system in FIG. 3 is applicable to the system described in U.S. patent application Ser. No. 09/794,693 as shown in FIG. 6, to enhance the communication from the transmitter to the receiver. The drum electronics generates the start of frame (SOF) control word as the leading edge of the paper passes the lead edge detector. The system knows there is a sheet flowing through the paper path that needs to be imaged. This indicates to the transmitter that an image is to be exposed onto the photo-conductor drum. The transmitter waits for the lineclock (LC) signal to indicate to the transmitter when each line of data is to be sent. The lineclock (LC) signal from the drum electronics indicates when the first lines of data are to be transferred across the communication link. The drum electronics forces the lineclock (LC) signal to a logical high when the first line of data is to be transferred. A short time after asserting the lineclock (LC) signal to a logic high state, the drum electronics then returns the lineclock (LC) signal to logic low. When the drum electronics determines that the next line of data is to be sent, the lineclock (LC) signal is again forced to a logical high. This continues until the image has been transferred. When the transmitter detects the lineclock (LC) signal going to logic high, it sends a line of data, with control words, across the communication link. The line of data is sent as follows: the transmitter sends the start of line SOL1 control word followed by the start of line SOL2 control word followed by the image data a specified number of clocks later. A specific number of clocks after the last data byte, the transmitter sends an end of line EOL1 control word and a specific number of clocks later, the end of line EOL2 control word. A specific number of clocks after the end of line EOL2 control word is sent, the transmitter sends the expose line EXP1 control word followed a specific number of clocks later by the expose line EXP2 control word. The transmitter then waits until the next lineclock (LC) signal transition before sending the next line of data. As seen in FIG. 3, the first start of line character, start of line SOL1 control word is corrupted by noise, however, using the invention as described herein, the data is received normally.

Figure 4:
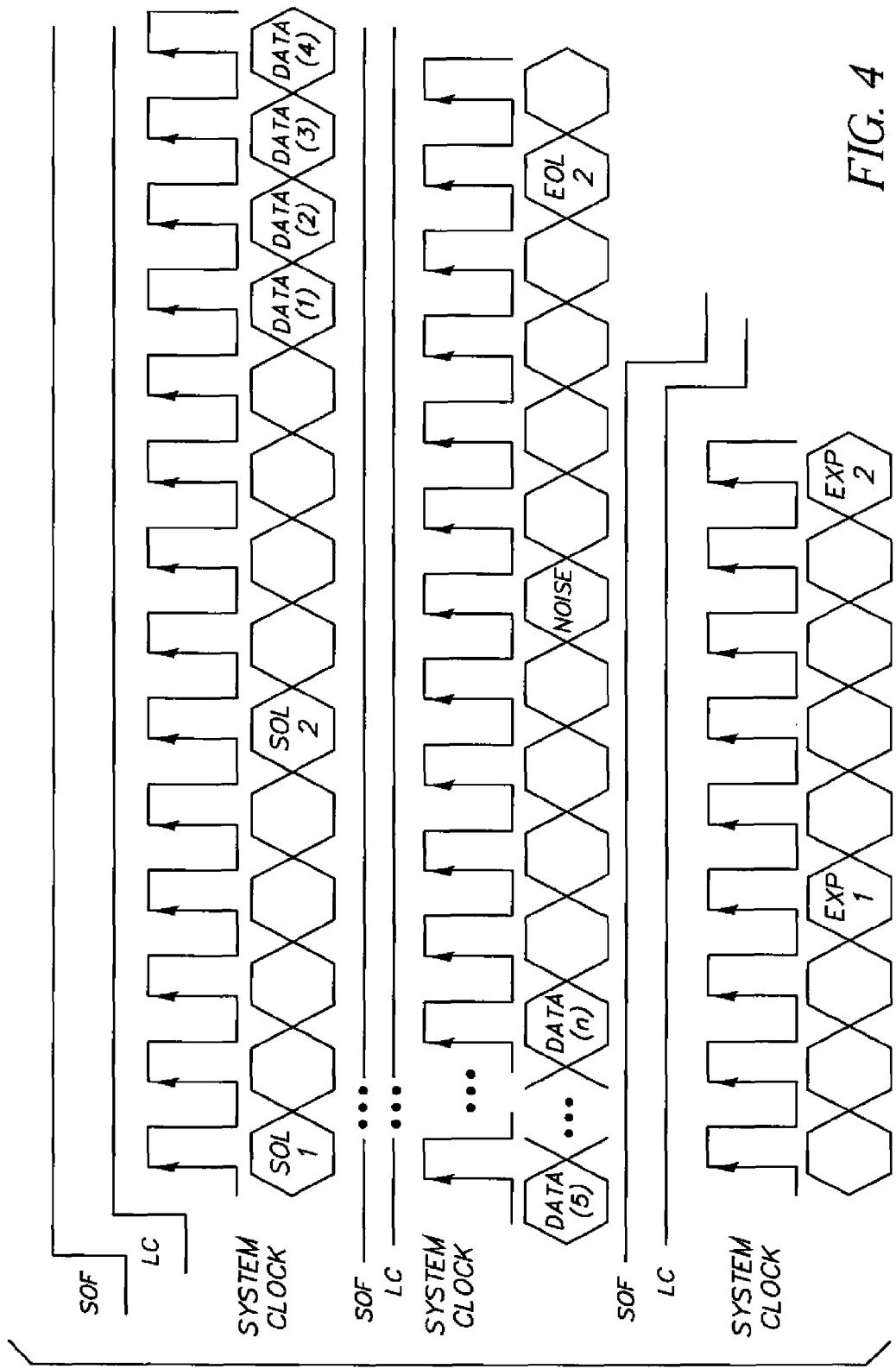
FIG. 4 is a timing diagram illustrating a corrupt control word that results in loss of data.

Referring to FIG. 4., a corrupted end of line EOL1 control word is illustrated. The invention shown in FIG. 4 will allow the receiver to properly indicate that the previous line of data has been completed and gives the receiver the opportunity to be ready to properly receive the next line of data that is sent by the transmitter. Absent the redundant end of line EOL1, EOL2 control words illustrated in FIG. 4, the receiver would have no indication that the previous line of data had ended and the receiver would decode data transmissions for the next line of data from the transmitter as if it belonged to the previous line of data. By not properly decoding the data, the receiver will not update the image storage elements properly. The receiver will continue to receive the expose line EXP control word and will expose the line of data that is in the storage elements resulting in corrupted images on the photoconductive drum. The invention prevents this result by the addition of redundant control words indicating the end of line as described above.

Figure 5:
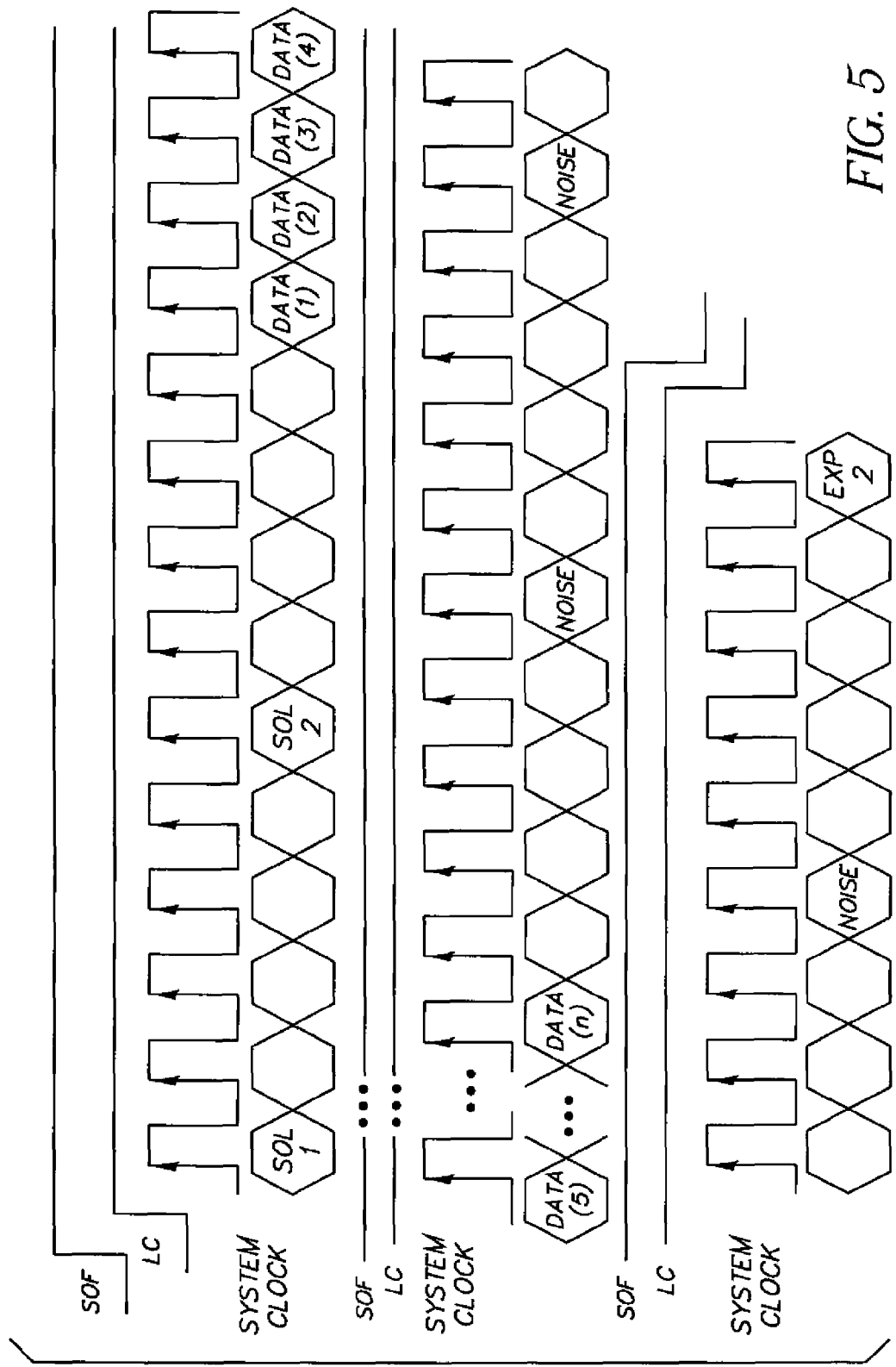
FIG. 5 is a timing diagram illustrating the use of redundant detection of control words to eliminate the loss of data illustrated in FIG. 4.

FIG. 5 is a further illustration of the concept of the invention. As seen in FIG. 5, both end of line EOL1, EOL2 control words are corrupted by noise. FIG. 5 also shows an expose line control word EXP1 that has also been corrupted. By providing the receiver with the capability to use either of the end of line EOL1, EOL2 control words as well as the expose line EXP1, EXP2 control words as an indication for the termination of the previous line of data, the chances that the data will be properly received by the receiver and be ready for the next line of data are substantially increased. Having the receiver ready for the next start of line character that will be sent by the transmitter is an important feature so that the transferring of data to the image storage elements can be accomplished properly. The invention's use of an expose line signal to indicate the termination of a line of data is another example of redundant signals being employed for indication of control words. Here, not only do multiple end of line EOL1, EOL2 control words operate to indicate that a complete line of data has been sent, also, an additional signal can provide an indication of the same event. The additional signal in this case is either of the expose line EXP1, EXP2 control words. Additionally, the preferred embodiment provides multiple expose line EXP1, EXP2 control words as seen in FIG. 5 to provide the receiver with four opportunities to decode a control word that indicated the same event, namely the end of a line of data has been reached. The detection of any of the EOL1, EOL2, EXP1, or EXP2 control words by the receiver will indicate that a complete line of data has been received. The rational here is to provide a redundant termination of the previous line of data with corrupted control signals as shown in FIG. 5. As seen in FIG. 5, the EOL1, EOL2 control words are corrupted to the extent that the receiver does not recognize either as a valid end of line character. Also, the first expose line EXP1 control word corrupted by noise. The provision of an additional expose line EXP2 control word that operates to indicate the end of a line of data as illustrated in FIG. 5 allows the receiver to decode the EXP control word and recognize that the line of data has ended even though neither of the end of line EOL1, EOL2 control words or expose line EXP1 control word have actually been received. The receiver then has the opportunity to prepare for the next line of data from the transmitter. In the preferred embodiment, the first expose line EXP1 control word is spaced 15 clocks after the end of the image data and the second expose line EXP2 control word is spaced 20 clocks after the end of the image data. Preferably, the circuit board that the receiver is on will also contain a buffer that is long enough to store the data stream from the start of the image data until 5 characters after the receipt of the expose line EXP2 control word.

The previously discussed timing diagrams illustrate the use of redundant detection of control words to eliminate the loss of data. FIG. 6 is a block diagram of the preferred transmitter 63 and receiver 93 architecture of the invention diagram illustrating data bytes and control words being transferred on the same signal lines. It is not required that data bytes and control words be transferred on the same bus as shown in FIG. 6, and other embodiments could employ different bus configurations. The preferred configuration shown in FIG. 6 has a transmitter section 60 and a receiver section 90. The transmitter section 60 takes data on an 8 bit image data bus 65, a start of frame (SOF) signal and a lineclock (LC) signal and uses them as inputs to transmitter Field Programmable Gate Array (FPGA) 64. The transmitter FPGA uses the image data bus 65 with the potential levels of the signals start of frame (SOF) and lineclock (LC) to form and the transmitter data bus 61 and transmitter control bus 62. The transmitter data bus 61, (TXDB 61) is an 8 bit data bus and the transmitter control bus 62 that carries 3 bit control words. A signal is placed on the transmitter control bus 62 as a control bit. The transmitter 63 takes the 8 bits on the transmitter data bus 61 and encodes 2 signals from the transmitter control bus 62 into a 10-bit signal that is sent across the RF Channel 69. The control bit changes state depending on whether the bits on the TXDB 61 define a data byte or a control word. This signal is encoded with the 8 bits into a 10-bit word by transmitter 63 and sent across the RF Channel 69 to receiver 93. It should be readily apparent that other types of application specific circuits could also function as transmitter FPGA 64.

Once the receiver 93 receives the 10-bit word, the control bit is decoded and passed to the receiver FPGA 94 to alert the receiver section 90 if the 8 bits are control or image data. The previously discussed control signals, such as start of line signals SOL1 and SOL2, are different control words that are placed on the same data bus at different times. Each control word typically has a different bit pattern on the 8-bit transmitter data bus. As previously stated, the transmitter 63 takes the 8 bits on the transmitter data bus 61 and encodes 2 signals from the transmitter control bus 62 into a 10-bit signal that is sent across the RF Channel 69. The receiver 93 decodes this 10-bit word and sends a signal across the receiver control bus 92 to the receiver FPGA 94 indicating the result of decoding the 10-bit signal and whether the decoded 8 bits represent control or data. When the transmitter 63 is not sending data or control information, it is in a 'marking' state during which it is sending synchronization characters that keep the transmitter 63 and receiver 93 in synchronization. All the decoded characters, control and data, pass through the receiver FPGA 94. Therefore, the receiver FPGA 94 must be capable of reading the start of line control words SOL1 and SOL2, the end of line control words EOL1 and EOL2, and the expose line EXP1, EXP2 control words after they are decoded.

The state machine in the preferred embodiment is set up so that at the occurrence of the first 'start of line' signal, the receiver FPGA 94 assumes image data will start being transmitted after 10 system clocks. At the occurrence of the second 'start of line' signal, the receiver FPGA 94 assumes image data will start being transmitted after 5 system clocks. The reception of either 'start of line' signal will start the storage of image data into the ram buffer based on the reception of the character and the number of system clocks that have elapsed.

Figure 7:
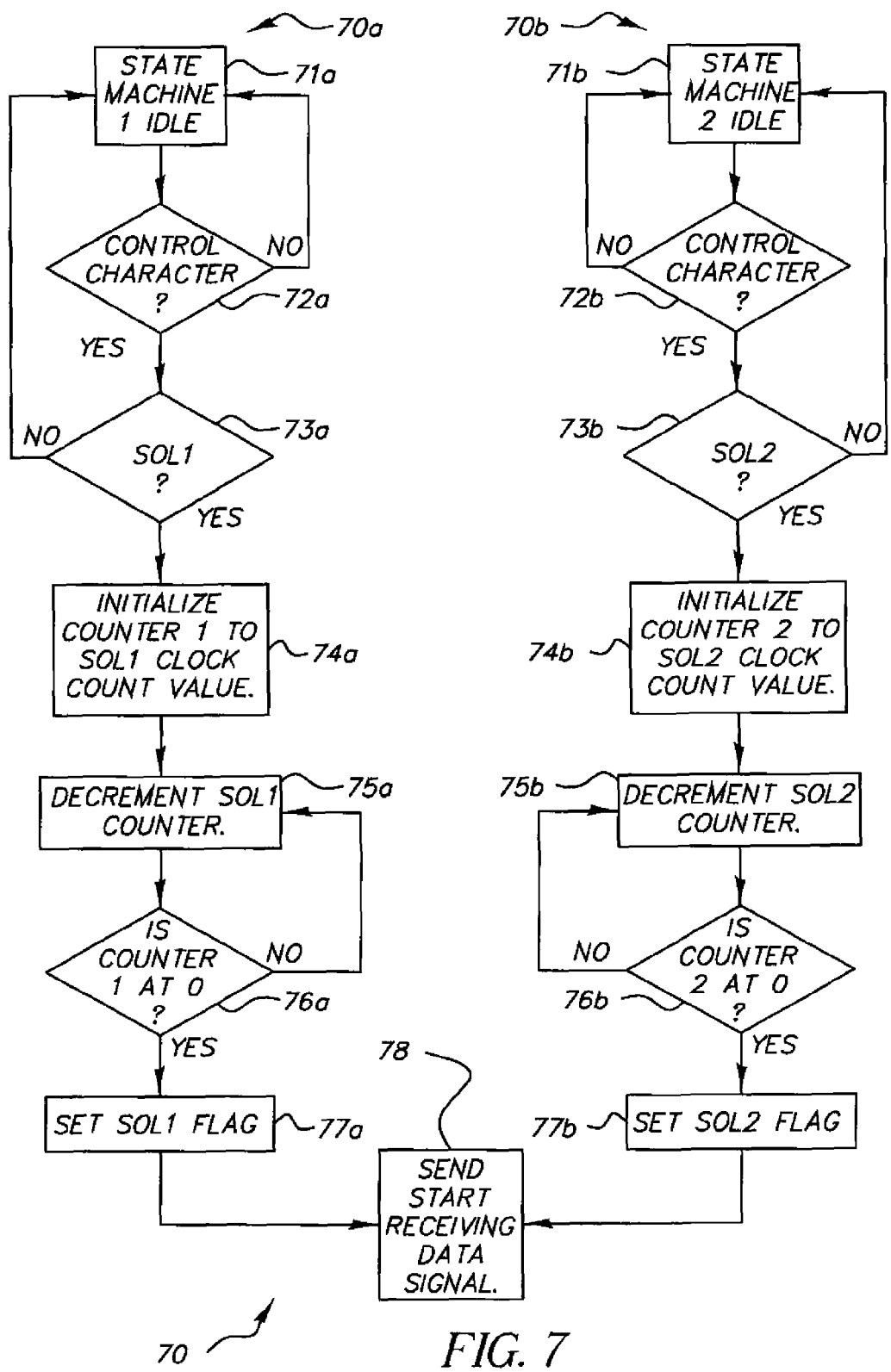
FIG. 7 is a state diagram that illustrates the preferred method for handling the redundant detection of start of line control characters of the invention.

Referring to FIG. 7, the state machines for start of line control words as envisioned by the preferred embodiment are illustrated. The receiver section 90 utilizes state machines 70a, 70b resident locally in the receiver FPGA 94 (which could also be an ASIC device) to decode received control words and data, and to transfer the received image data to appropriate storage locations. The preferred embodiment employs dual start of line control words SOL1, SOL2 and employs one state machine for each of these control words. Initially state machines 70a, 70b are in idle 71a, 71b. Control word 72a, 72b waits for the reception of a start of line control word SOL1, SOL2, upon reception a determination is made by Character SOL 73a, 73b if the control word is one of the start of line words SOL1, SOL2. The receiver FPGA 94 initializes a counter 74a, 74b if the control word is either of the SOL1, SOL2 control words. This clock counting circuit is set to count the number of clocks from the reception of its particular start of line character to the start of the line of image data. Preferably, the transmitter sends the SOL1 control word ten system clocks before the first byte in the line of image data and the SOL2 control word five clocks before the first byte of image data. In an error-free system, the receiver will decode the SOL1 control word first and start a state machine that is set to count ten system clocks before receiving the first byte of image data. Decrement SOL1 counter 75a reduces the count by one each clock cycle until the test is Counter 1 at zero 76a returns true at which point the receiver FPGA 94 sets SOL1 flag 77a and the receiver FPGA 94 will send the start receiving data signal 78 to the image data reception circuitry. In a noise free system, five clock cycles will elapse after receiving the SOL1 control word before receiving the SOL2 control word. The reception of the SOL2 control word starts a second state machine 70b that is identical to the first state machine 70a, except that initialize a counter 74b is set to decrement SOL2 counter 75b by five system clocks before the test to determine whether the counter is zero 76b is satisfied to send start receiving data signal 78 to activate the image data reception circuitry. In essence, the outputs from the two clock counting state machines are ORed together such that either signal is operative to prepare the receiver for the image data. In a system containing noise, either SOL1 or SOL2 control words can be corrupted and the receiver will still recognize the start of the line of image data since the other control word is received properly. The number of SOL characters sent by the transmitter is only limited by the remaining bandwidth and the acceptable complexity at both the transmitter and receiver. A system deployed in a higher noise environment could require more SOL control words. The corruption of control words in a high noise environment results in more severe consequences than the corruption of data. Data can also be corrupted in a high noise environment, but the corruption of data might go unnoticed until the noise reached a very high threshold. Moreover, the corruption of data will typically take place on a bit-by-bit basis. The preferred embodiment uses a system wherein one 8-bit image word (a byte) is transferred to represent one pixel (one dot) that is placed on the photoconductor. A corrupted bit might change the density of the dot by some amount, but that dot would still be placed on the photoconductor. If the transmitter and receiver lose synchronization because a control word is not recognized, complete lines of data can be lost and never be represented by the imaging device.

Figure 8:
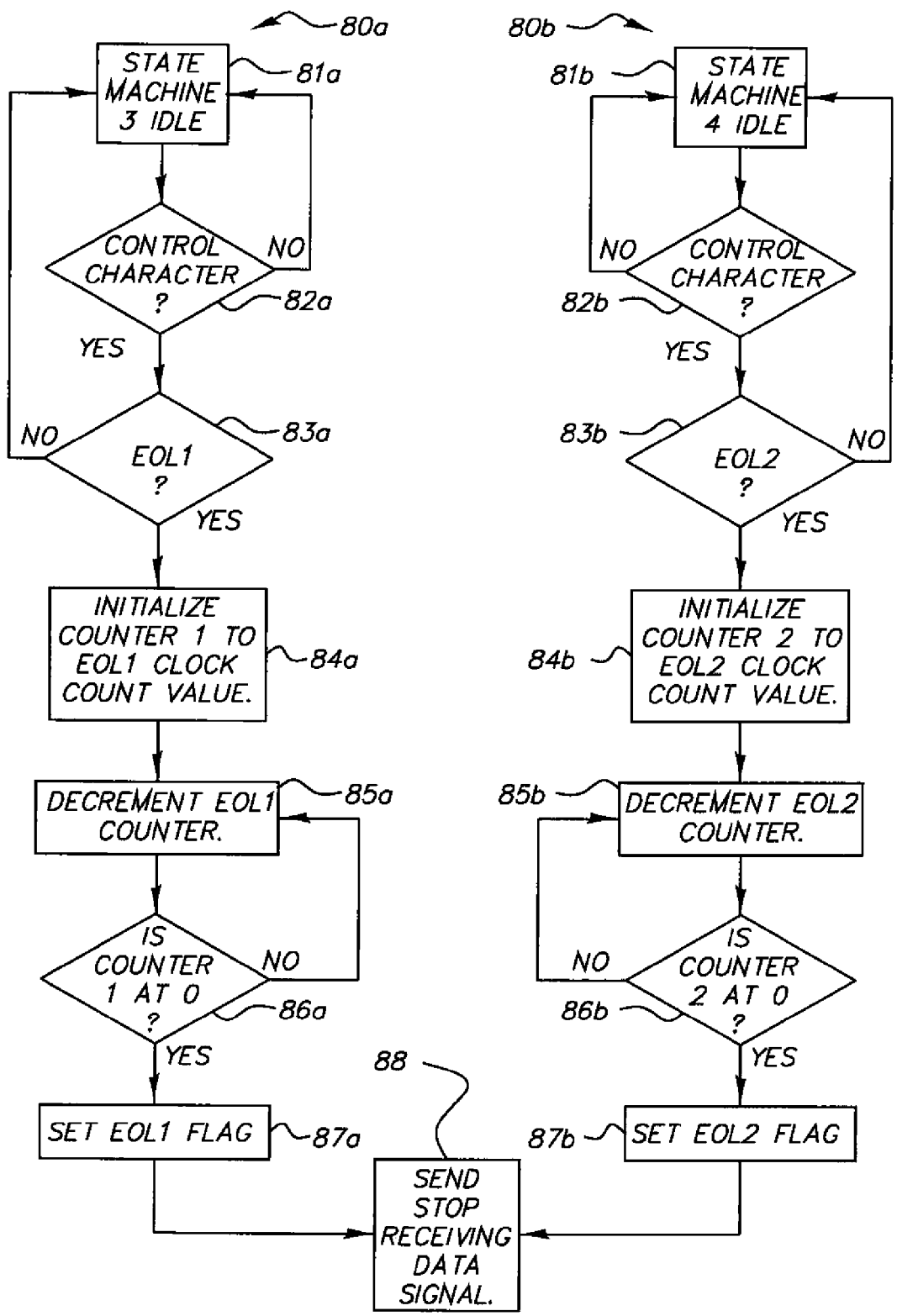
FIG. 8 is a state diagram that illustrates the preferred method for handling the redundant detection of end of line control characters of the invention.

As previously stated, the preferred embodiment employs two end of line EOL1, EOL2 control words that have different bit patterns. Additionally, two expose line EXP1, EXP2 control words also have different bit patterns are used in the data transfer sequence. Referring to FIG. 8, a pair state machines 80a, 80b wait for the reception of characters representing the end of line. The state machines illustrated in FIG. 8 are those employed by the preferred embodiment that are set so that the receiver FPGA 94 will assume that a line of image data has been completely transmitted upon the reception of either of the end of line EOL1, EOL2 control words. Additional state machines (not shown) will operate once either of the expose line EXP1, EXP2 control words are detected so that receiver FPGA 94 will send the stop receiving data signal 88 upon reception of either of the expose line EXP1, EXP2 control words. The state machines shown in FIG. 8 are identical to those discussed above in FIG. 7 except for the value use to initialize counter 84a, 84b employs different presets values. The end of line EOL1, EOL2 and expose line EXP1, EXP2 control words are different control words from the start of line SOL1, SOL2 control words and have initialization values as previously discussed. If EOL1 83a returns a positive result after detection by control word 82a, then idle 81a stops and initialize a counter 84a presets a counter with a predetermined value. Decrement EOL1 counter 85a runs until counter is zero 86a is true. Set EOL1 flag 87a indicates that the receiver FPGA 94 knows the end image data is 5 characters back in the ram buffer. If the end of line EOL1 control word was not received and the end of line EOL2 control word was detected by EOL2 83b, then state machine 80b leaves the idle 81b state and initializes a counter 84b with a value that will allow decrement EOL2 counter 85b to run long enough such that counter is zero 86b will be true and set EOL2 flag 87b is run resulting in the sending of the stop receiving data signal 88. The receiver FPGA 94 will know that the image data is 10 characters back in the ram buffer.

If for some reason both end of line EOL1 and EOL2 control words are missed, the reception of either of the expose line EXP1, EXP2 control words, can operate to indicate the end of a line of data. The state machines employed for detecting of either of the expose line EXP1, EXP2 control words are the same as those used for detecting the end of line EOL1 and EOL2 control words except for the preset values for the counter are different. If the EXP1 flag is set in the receiver FPGA 94, then the receiver FPGA 94 knows that the image data is 15 characters back in the ram buffer. If the EXP2 flag is set, then the receiver FPGA 94 knows that the image data is 20 characters back in the ram buffer. The receiver FPGA 94 knows which control signals were detected since flags are set internal to the receiver FPGA 94, and, therefore, the receiver FPGA 94 knows which control word started the reception of the data and which ended the reception of the data.

As an example of the preferred embodiment, assume the SOL1 control word is missed and the SOL2 control word is received. Exactly five clock cycles after reception of the SOL2 control word, the receiver FPGA 94 starts storing image data into the ram buffer. The receiver FPGA 94 continues to store data until a 'stop storing data' signal is received. The stop storing data signal could have been caused by the reception of any of the 4 characters used to identify that an entire line of data has been received which are either of the EOL1, EOL2, EXP1 and EXP2 control words. The receiver FPGA checks which flags are set. If the EOL1 flag is set, then it knows the image data ends 5 characters back in the ram. This is because the EOL1 character occurs 5 clocks after the end of the image data. If the EOL1 flag had not been set, but the EOL2 flag had been set, the receiver FPGA 94 would go 10 characters back in the ram buffer to find the end of the image data. Once it has been determined that the end of the data has been reached, the ram buffer is emptied into the storage elements to be ready for the next exposure cycle.

Numerous variations will be apparent to those skilled in the art. For example the preferred embodiment discussed above checks flags within the receiver FPGA 94 by checking the highest priority first, therefore, even if multiple flags are set within the receiver FPGA 94 to indicate the same event, the highest priority flag indicates the earliest occurrence of that event. An alternative embodiment could design the receiver FPGA 94 to enable flags once set.

Additionally, the foregoing discuses state machines being used to detect each of several characters. It should be understood that receiver FPGA 94 can accommodate a design wherein there is a single state machine for the detection of all characters and certain functional blocks within the state machine could detect any of the control words. For example, the functional blocks SOL1 73a SOL2 73b EOL1 83a and EOL2 83b can be a single functional block that identifies the detected control word. Preset counter values would then be determined by selecting the appropriate counter value for the detected control word.

In either of the foregoing embodiments, employing redundant characters to indicate the start of data storage and redundant characters to indicate the end of the reception of data dramatically increases the probability of correctly receiving the image data. The foregoing examples employ two control words for each type of character, however, it will be understood that numerous control words for each character can be used provided there is sufficient bandwidth within the system. Employing more characters would further increase the probability of detecting the intended event accurately.

The foregoing description details the embodiments most preferred to the inventors. Variations of these embodiment will be readily apparent those skilled within the relevant arts, accordingly, the scope of the invention should be measured by the appended claims.

PARTS LIST 60 transmitter section
61 transmitter data bus
62 transmitter control bus
63 transmitter
64 transmitter FPGA
65 image data bus
69 RF Channel
70a state machine
70b state machine
71a idle
71a idle
72a control word
72b control word
73a SOL1
73b SOL2
74a initialize a counter
74b initialize a counter
75a decrement SOL1 counter
75b decrement SOL2 counter
76a counter is zero
76b counter is zero
77a set SOL flag
77b set SOL flag
78 send start receiving data signal
80a state machine
80b state machine
81a idle
81a idle
82a control word
82b control word
83a EOL1
83b EOL2
84a initialize a counter
84b initialize a counter
85a decrement EOL1 counter
85b decrement EOL2 counter
86a counter is zero
86b counter is zero
87a set EOL1 flag
87b set EOL2 flag
88 send start receiving data signal
90 receiver section
93 receiver
94 receiver FPGA
EOL end of line control word
EOL1 end of line control word
EOL2 end of line control word
EXP expose line control word
EXP1 expose line control word
EXP2 expose line control word
LC lineclock SOF start of frame
SOL start of line control word
SOL1 start of line control word
SOL2 start of line control word

What is claimed is:

1. A computer-implemented method of receiving data, the method comprising the steps of:
    receiving a frame of data from a communication channel, the frame comprising a first 8-bit digital control word, a second 8-bit digital control word, and message data, wherein each of the control words has a unique bit pattern and is associated with a different time interval, each time interval individually indicating where or when message data begins or began in the frame of data relative to the time interval's associated control word;
    storing the frame of data as it is received in a buffer that is long enough to store the frame of data, wherein at least one of the control words is transmitted after the message data in the frame of data and indicates where the message data began in the frame of data; and
    identifying at least some of the data in the stored frame of data as the message data based upon receipt of the at least one of the control words transmitted after the message data, wherein only one of the control words needs to be received to identify the message data in the stored frame of data.

2. The computer-implemented method of claim 1, wherein at least one of the control words is transmitted before the message data in the frame of data.

3. The computer-implemented method of claim 1, wherein at least one of the control words is transmitted before the message data in the frame of data.

4. The computer-implemented method of claim 1, wherein the control words comprise a first end-of-frame control word and a second end-of-frame control word.

5. The computer-implemented method of claim 1, wherein the frame of data further includes a third control word.

6. A computer-implemented method of communicating data, the method comprising the steps of:
    transmitting a frame of data across a communication channel, the frame comprising message data, a first 8-bit digital control word and a second 8-bit digital control word, wherein each of the control words has a unique bit pattern and is associated with a different time interval, each time interval individually indicating where or when the message data begins or began in the frame of data relative to the time interval's associated control word, and wherein at least one of the control words is transmitted after the message data in the frame of data and indicates where the message data began in the frame of data;
    receiving as first data the at least one of the control words transmitted after the message data and other data;
    storing the received first data in a buffer that is long enough to store the frame of data; and
    identifying at least some of the other data in the stored first data as the message data based upon receipt of the at least one of the control words transmitted after the message data, wherein only one of the control words needs to be received to identify the message data from the other data.

7. The computer-implemented method of claim 6, wherein at least one of the control words is transmitted before the message data in the frame of data.

8. The computer-implemented method of claim 6, wherein at least one of the control words is transmitted before the message data in the frame of data.

9. The computer-implemented method of claim 6, wherein the control words comprise a first end-of-frame control word and a second end-of-frame control word.

10. The computer-implemented method of claim 6, wherein the frame of data further includes a third control word.

* * * * *